United States Patent [19]

Hähn et al.

[11] Patent Number: 5,401,568
[45] Date of Patent: Mar. 28, 1995

[54] COATED FILLERS HAVING SILICIC ACID FOR HEAT-SENSITIVE RECORDING MATERIALS

[75] Inventors: Reinhard Hähn, Pressgasse; Friedrich Ruf, Tiefenbach, both of Germany

[73] Assignee: Sud-Chemie Aktiengesellschaft, Munich, Germany

[21] Appl. No.: 957,243

[22] Filed: Oct. 6, 1992

[30] Foreign Application Priority Data

Oct. 8, 1991 [DE] Germany ............... 41 33 318.7

[51] Int. Cl.⁶ ............................................. B32B 9/00
[52] U.S. Cl. ................................. 428/323; 428/404; 428/331
[58] Field of Search .................. 428/404, 323, 331; 503/200, 226, 207, 227

[56] References Cited

U.S. PATENT DOCUMENTS

| | | | |
|---|---|---|---|
| 4,168,845 | 9/1979 | Oeda et al. | 282/27.5 |
| 4,311,758 | 1/1982 | Oeda et al. | 428/341 |
| 4,414,259 | 11/1983 | Tsuchiya et al. | 428/207 |
| 4,435,004 | 4/1984 | Shanton | 428/404 |
| 4,527,178 | 7/1985 | Usui et al. | 346/207 |
| 4,985,394 | 1/1991 | Mori et al. | 503/226 |
| 4,997,806 | 3/1991 | Torii | 503/226 |
| 5,045,523 | 9/1991 | Funae | 503/207 |
| 5,124,306 | 6/1992 | Yamamoto | 503/207 |

FOREIGN PATENT DOCUMENTS

0135976  1/1984  European Pat. Off.

*Primary Examiner*—Patrick J. Ryan
*Assistant Examiner*—Patrick Jewik
*Attorney, Agent, or Firm*—Scott R. Cox

[57] ABSTRACT

A particulate composition to be used as a filling material in the heat-sensitive layer of a heat-sensitive recording material is described. The material is characterized by the fact that it occurs as fine-grained white pigments which are predominantly bound to amorphous precipitated silicic acid, whereby the amorphous precipitated silicic acid either (a) is wrapped in layers around the fine-grained white pigment or (b) occurs as fine particles that are bound to the fine-grained white pigment in a punctiform manner and whereby the water content of the material (b) is 1 to 10 percent by weight, preferably 2 to 8 percent by weight.

25 Claims, No Drawings

COATED FILLERS HAVING SILICIC ACID FOR HEAT-SENSITIVE RECORDING MATERIALS

BACKGROUND OF THE INVENTION

The invention relates to a particulate material to be used as filling material in the heat-sensitive layer of a heat-sensitive recording material, particularly a thermoreactive paper.

A heat-sensitive recording material, for example a thermoreactive paper, usually contains a carrier and a heat-sensitive recording layer produced on the carrier. This recording layer is essentially composed of an electron-donating, colorless or only slightly colored dye precursor (leuco dye) and an electron-accepting dye developer, in most cases a phenolic compound. When heated with a thermal print head, the dye precursor instantly reacts with the dye developer, thus creating a recorded image or a dye-developer complex.

These heat-sensitive recording materials are widely used in facsimile machines and printers and as labeling paper. Without doubt, the main area of application is the operation of facsimile machines, where the continuously increasing transmission speed causes a demand for ever more sensitive recording materials. This demand is satisfied by the addition of sensitizing agents that accelerate the color reaction as well as by fine-grained pigments which are used to prevent the adhesion of the molten dye-developer complex to the thermal print head.

These fine-grained filling pigments are characterized by a high oil absorption of generally >100 ml 100 g, a high particle fineness with a mean secondary particle size of generally at least 70 percent by weight <4 μm (measured according to the centrifugal sedimentation method). Also, they are characterized by a surface activity as small as possible, that is, a specific surface generally of <100 m²/g (determined according to the BET-method). The latter is significant for avoiding background dyeing on the thermoreactive papers, Which can occur as a result of an undesired color reaction of the dye precursor with an overly reactive dye developer pigment.

Well-known paper pigments, such as calcium carbonate, kaolin, talc, aluminum hydroxide, titanium dioxide or synthetic organic pigments are used as white pigments. However, none of these pigments or pigment mixtures fulfills all of the criteria mentioned above. For example, they lack sufficient oil absorption.

From German DE-A-3, 942, 692 (U.S. Pat. No. 4,985,394), a heat-sensitive recording material is known which contains a carrier sheet underneath a heat-sensitive dyeing layer with a leuco dye and a dye developer, and this heat-sensitive dyeing layer is covered with a protective layer. The protective layer contains at least one inorganic pigment from the group of silicic acid and calcium carbonate, each with an average particle diameter of 0.1 μm or less and a water-soluble binding agent. Therefore, the pigment is not located in the heat-sensitive dyeing layer. This design has the disadvantage that the protective layer constitutes a barrier for heat transmission, impairing efficient action of the thermal print head on the heat-sensitive layer of the recording material. Furthermore, silicic acid and calcium carbonate occur as a mechanical mixture.

From German DE-A-3,911,199, heat-sensitive recording materials are known which contain an intermediate layer of colloidal silicon dioxide and/or aluminum oxide between a carrier and the heat-sensitive color-producing layer. The silicon dioxide can also occur as a mechanical mixture with a white pigment, such as calcium carbonate, that is, these two components are not bound to one ,another. Moreover, they are not localized in the heat-sensitive color-producing layer, but rather in the intermediate layer functioning as a reflective layer.

From German DE-A-3,019,591 (U.S. Pat. No. 4,414,259), a heat-sensitive recording material is known that contains an oil-absorbing pigment, such as finely dispersed silicon dioxide, and an inorganic pigment, such as calcium carbonate, in its dye-developing layer. These two substances, however, occur only as a mechanical mixture and are not bound together.

From German DE-0-2,800,485 (U.S. Pat. No. 4,168,845 and 4,311,758), a similar heat-sensitive recording material is known that also contains the finely dispersed silicon dioxide and the white pigment only in the form of a mechanical mixture.

From European Patent B1-O-114,749, an amorphous silicate is known which is suitable filling material for thermoreactive papers. Its production is performed by converting alkali silicate with mineral acid in a concentrated alkali salt solution, in which process initially fine-grained amorphous silicic acid is produced directly by avoiding the sol state. With a metal hydroxide, the silicic acid is converted to an amorphous silicate exhibiting the required low surface activity with specific surfaces of <100 m²/g, as well as an oil absorption of 100 to 200 ml/100 g. The secondary particle size of 90 percent by weight is <4 μm (measured according to the centrifugal precipitation method), the bulk density is reported as 0.14 to 0.30 g/cm³. The disadvantage of this process is that large amounts of concentrated salt solutions have to be used which can lead to an enormous disposal problem and thus can cause environmental problems.

From European Patent B1-0 135,976, a particulate material to be used as filling material in the heat-sensitive layer of heat-sensitive recording paper is known. This material contains fine-grained amorphous silicic acid with a specific BET-surface of 10 to 100 m²/g and a bulk density of 0.14 to 0.3 g/cm³; the fine-grained amorphous silicic acid has a mean particle size distribution of at least 90 percent by weight <4 μm. The production of this particulate material is carried out by converting an alkali silicate with an acid in a concentrated alkali salt solution by which process fine particles of a silica gel are precipitated while the sol state is avoided. Again, the disadvantage of this process is that large amounts of concentrated salt solutions have to be used.

Surprisingly, it was found that otherwise well-known filling materials for paper which exhibit an oil absorption too low for them to be used in heat-sensitive recording materials, can be combined with precipitated silicic acid to form filling materials which are very well suited as thermoreactive pigments with respect to oil absorption, particle fineness and surface activity.

SUMMARY OF THE INVENTION

This invention is directed to a particulate composition to be used as filling material in the heat-sensitive layer of a heat-sensitive recording material, e.g., a thermoreactive paper.

The particulate composition of this invention is characterized by the fact that it comprises fine-grained white pigments predominantly bound to amorphous precipitated silicic acid, whereby the amorphous precipitated silicic acid either (a) is wrapped in a layer around the fine-grained white pigment or (b) occurs as fine particles bound ! to the fine-grained white pigment in a punctiform manner.

The particulate composition of this invention has an oil absorption (according to DIN 52199) of about 100 to about 200 mg/100 g, and preferably about 150 ml/100g.

The specific BET-surface area of the particulate composition is about 30 to about 90 $m^2/g$, and preferably about 60 $m^2/g$.

The white pigment content of the composition of this invention is about 95 to about 20 percent by weight and the amorphous silicic acid content (as dry $SiO_2$) is about 5 to about 80 percent by weight. Preferably, the white pigment content is about 80 to about 30 percent by weight and the amorphous silicic acid content is about 20 to about 70 percent by weight.

The composition of this invention has a particle size range of about 100 to about 0.5 $\mu$m with the mean particle diameter being about 3 to about 8 $\mu$m, preferably about 4 to about 6 $\mu$m.

DESCRIPTION OF THE INVENTION

The particulate composition of this invention is comprised of fine-grained white pigments predominantly bound to amorphous precipitated silicic acid. The composition wherein the amorphous precipitated silicic acid is wrapped in a layer around the fine-grained white pigment (variant (a)) is produced by mixing a suspension of the fine-grained white pigment with an alkali water glass solution, followed by adding an acid or introducing $CO_2$ gas in order to reduce the pH of the mixture so that the amorphous silicic acid is deposited on the white pigment. The particulate composition is recovered by filtration or centrifugation. It can be dried, if desired, to a water content of about 1 to about 10 percent by weight, preferably about. 2 to about 8 percent by weight. Grinding is conducted, if necessary, to obtain a particle size range of about 100 to about 0.5 $\mu$m with a mean particle diameter of about 3 to about 8 $\mu$m, preferably about 4 to about 6 $\mu$m.

The white pigments used in the variant (a) process are alkaline earth carbonates, e.g., calcium carbonate or magnesium carbonate, alkaline earth hydroxides, e.g., calcium hydroxide or magnesium hydroxide, and aluminum hydroxide or mixtures thereof. The particle size of these white pigments are <25 $\mu$m (measured in aqueous suspension in the Malvern Particle Size 2600C) with a mean particle diameter (d50) of between about 2 and about 4 $\mu$m.

The binding between the white pigment particles and the precipitated silicic acid made according to the variant (a) process is particularly good because the silicic acid precipitated from the aqueous medium enwraps the surface of the white pigment particles.

In carrying out the process for variant (a), the white pigment is used as a suspension in water with a solids content of about 10 to about 50 percent by weight, preferably about 20 percent by weight.

The alkali water glass solution has a concentration of about 10 to about 30 percent by weight, preferably about 15 percent by weight. The weight percents are based on $SiO_2$ content.

The acids which are added to lower the pH are mineral acids, e.g., hydrochloric acid, sulfuric acid, or phosphoric acid, and organic acids such as acetic acid or propionic acid.

When using basic pigments, such as calcium carbonate or magnesium carbonate, the reduction in pH must be regulated very carefully in order to avoid losses caused by a reaction of the pigment particles with the acid. The pH is kept preferably on the basic side.

The temperature at which the process is conducted is not. critical and can vary from about 20° C. to about 99° C., preferably about 70° C. to about 90° C.

The precipitated composition of this invention can be ground using, for example, a jet-mill with no increase in its specific surface area.

A significant advantage of this process over those described in European Patents No. 135976 and NO. 114749 is the ability to operate without salt solutions, thereby avoiding connected environmental problems. Moreover, it was surprising to find that the composition of the invention exhibits properties corresponding to those of pure amorphous precipitated silicic acid, although the white pigment particles function only as "extender pigments", so to speak.

The particulate composition of this invention which comprises fine particles of amorphous precipitated silicic acid bound to the fine-grained white pigment in a punctiform manner (variant (b)) is produced by pulverizing fine-grained white pigment with fine-grained amorphous precipitated silicic acid. In this process, the water content of the precipitated silicic aid and/or the white pigment is adjusted so that the mixture being pulverized has a water content of about 1 to about 10 percent by weight, preferably about 2 to about 8 percent by weight. The specified water content is important in this process since punctiform binding (achieved by pulverization) of dry particles of white pigment and silicic acid is practically impossible. Without water being present, the particles separate. It is likely that during pulverization, a solid substance reaction favored by the presence of small amounts of water occurs at the surface of the particles, thereby yielding a strong binding between the particles. Such as binding cannot be obtained by jointly pulverizing the particles in the dry state.

If the water content of either variant (a) or variant (b) is more than 10 percent by weight, there is an increase in background dyeing when used in the heat-sensitive recording material.

The white pigments used in the variant (b) process are the same as those used in the variant a process plus calcinated kaolin or a pigment based on urea-formaldehyde resin or mixtures thereof. Natural or precipitated alkaline earth metal carbonates can be use in both variant (a) and variant (b) processes. However, the precipitated versions are preferred due to their generally higher degree of whiteness.

The particle size of the white pigment is the same size as used in the variant (a) process. The proportion of fine-grained white pigment is about 1 to about 50 weight percent, preferably about 10 to about 40 weight percent.

In this variant (b) process, it is advantageous to start with a precipitated silicic acid of a particle size range of about 100 to about 1 $\mu$m with a mean particle diameter (d50) between about 10 and about 3 $\mu$m, preferably about 7 and about 4 $\mu$m.

The fact that precipitated amorphous silicic acid can also be relatively coarse-grained constitutes an advantage of the second process version. The jointly ground products are superior in quality to control samples which were ground separately to the same particle size and subsequently homogenized.

Grinding is conducted using any of the well-known mills or pulverizers, examples of which are ball mills, hammer mills, pin mills, and jet mills.

The following embodiments describe the invention in a non-restrictive manner. Examples 1, 2 and 5 to 8 describe the variant (a) process. Examples 10, 11 to 14 and 17 to 20 describe the second process version—variant (b). Examples 3, 4, 9, 12, 13, 15 and 16 are comparative examples.

EXAMPLE 1

Precipitated calcium carbonate of a mean particle diameter of 2.7 μm is dispersed in water (solid substance content: 20 percent by weight) and slowly, a 20 percent sodium silicate solution is added in an amount corresponding to 30 percent by weight content of $SiO_2$ while the solution is stirred vigorously. Following heating up to 80° C., the highly basic pH of >13 is slowly reduced to 9.7 by means of diluted sulfuric acid. The solution is aged at 80° C. for 30 minutes and filtered hot under a vacuum. The product is mildly dried at 75° C. and subsequently ground in a fluid bed reverse jet mill to a mean particle size (d50) of 4.0 μm. Mean particle size is determined in aqueous solution by means of a Malvern 2600 C Particle Sizer. The results are summarized in Table I. The measured data are obtained according to the following process:

Oil Absorption: The test was preformed according to DIN 53199

Specific Surface: Measurement was conducted at the temperature of liquid nitrogen, according to the so-called BET-method described in S. Brunauer, P. H. Emmet and E. Teller, J. Am. Chem. Soc., (1938), Vol. 60, p. 309.

Surface Activity: In order to determine the inherent activity of the pigments—and therefore the background dyeing of a thermoreactive coating—95 percent by weight of the pigment to be tested are processed with 5 percent by weight of a styrene butadiene rubber binding agent (SBR—binding agent, DOW latex 675) into a simple brushing paint and doctored onto wood-free coated base paper at 6 g/m².

Following drying and equalization at 50 percent relative air humidity, a color copy is produced at a laboratory calendar by means of self-duplicating CB-paper which contains crystal violet lactone (CVL) as the leuco dye in its capsules. The intensity of this copy is the measure for the Surface activity (inherent activity) of the pigments.

The following evaluation is applied in this procedure:

| Symbol | Evaluation |
| --- | --- |
| + | slight surface activity |
| | slight background dyeing |
| O | medium surface activity |
| | medium background dyeing |
| − | high surface activity |
| | high background dyeing |

EXAMPLE 2

The reaction is carried out analogous to the process described in Example 1 except that the adjustment of the mean particle size to 4.0 μm is performed in a rotary ball mill.

The results are summarized in Table I.

COMPARATIVE EXAMPLE 3

Sodium silicate (water glass) is placed in distilled water at the same silicate concentrations is given in Example 1. After heating up to 80° C., the mixture is titrated slowly with diluted sulfuric acid to a pH of 9.7. Following 30 minute of aging at 80° C., the precipitation product is filtered off, dried mildly to a water content of 5 percent at 75° C. and ground in the jet mill to a mean particle diameter of 4.2 μm.

The results are summarized in Table I.

COMPARATIVE EXAMPLE 4

The amorphous silicic acid produced according to Comparative Example 3 is homogenized in the dry state with the precipitated calcium carbonate of Example 1 in a weight ratio of 30 to 70. Therefore, the ratio of silicic acid to calcium carbonate correlates to the one in Example I.

The results are summarized in Table 1.

EXAMPLE 5

The procedure according to Example 1 is repeated, except for mixing the precipitated calcium carbonate with 50 percent by weight sodium silicate solution (referred to the $SiO_2$ content).

The results are summarized in Table I.

EXAMPLE 6

Calcined kaolin with a mean particle size of 2.9 μm is dispersed in water (solid substance content: 20 percent by weight) and mixed with a sodium silicate solution (50 percent by weight referred to $SiO_2$) while the solution is stirred vigorously. Following heating up to 80° C., the pH is adjusted slowly to 9.5 with diluted sulfuric acid. The precipitation product is allowed to age for 30 minutes, isolated, dried at 75° C. and ground in a jet mill to a mean particle size of 3.9 μm.

The results are summarized in Table I.

EXAMPLE 7

The procedure according to Example 6 is repeated, except that the pH is adjusted to 8.0 by means of dilute sulfuric acid.

The results are summarized in Table I.

EXAMPLE 8

Aluminum hydroxide with a mean particle diameter of 2.5 μm is dispersed in water (solid substance content: 20 percent) and mixed with a sodium silicate solution (50 percent referred to the $SiO_2$ content). Again, silicic acid is precipitated at 80° C. by adding dilute sulfuric acid dropwise until a pH of 9.5 is reached.

The results are summarized in Table I.

COMPARATIVE EXAMPLE 9

A precipitated silicic acid produced according to EP-B1-0 114 749 ( Commercial product Mizukasil P832) is contrasted with Examples 1 to 8.

The results are summarized in Table I.

TABLE I

Properties of the Thermoreactive Filling Materials

|  | Specific Surface m²/g | Oil Absorption ml/100 g | Mean Particle Diameter d 50 | Surface Activity |
|---|---|---|---|---|
| Example 1 | 57 | 126 | 4.0 | + |
| Example 2 | 95 | 130 | 4.2 | ◯ to + |
| Comparative Example 3 | 300 | 260 | 4.2 | − |
| Comparative Example 4 | 90 | 95 | 4.3 | − to ◯ |
| Example 5 | 65 | 162 | 4.0 | + |
| Example 6 | 77 | 150 | 3.9 | + |
| Example 7 | 85 | 158 | 4.1 | + |
| Example 8 | 62 | 152 | 3.9 | + |
| Comparative Example 9 | 50 | 210 | 4.3 | − to ◯ |

As seen from Table I, the compositions according to the invention fully meet the requirements for a filling material for thermoreactive papers. Moreover, comparing Example 1 to Example 2 shows that a lower surface activity is obtained when a jet mill is used for adjusting the necessary particle size. The Comparative Example 3 demonstrates the uselessness of a material with a high specific surface, even when it is homogenized in the dry state with precipitated calcium carbonate, as performed in Comparative Example 4.

Finally, Comparative Example 9 substantiates the superiority of the material according to the invention over the material according to EP-B 1-0 114,749.

The following Examples describe the second process version:

EXAMPLE 10

A commercial, amorphous precipitated silicic acid with an oil absorption of 228 ml/100 g, a specific surface of 55 m²/g and a particle size range of 70 to 1 μm with a mean particle diameter (d50) of 18 μm (measured in the Malvern Particle Sizer 2600 C), is ground together with precipitated calcium carbonate (mean particle size: 2.7 μm) in a weight ratio of 60/40 in a hammer mill. The water content of the material being ground is 4 to 5 percent by weight. The results are summarized in Table II. The measured data are obtained as explained in Example 1, the corresponding applies to the symbols used for evaluation.

COMPARATIVE EXAMPLE 11

The amorphous precipitated silicic acid and the calcium carbonate of Example 10 are used in the same weight ratio and stirred in a 30 percent by weight aqueous suspension at 80° C. for 2 hours. The material is then suction filtered, dried mildly to a water content of 50 percent by weight at 70° C. and ground to a mean particle diameter of 5.2 μm in a hammer mill.

The results are summarized in Table II.

COMPARATIVE EXAMPLE 12

The same weight ratio of the amorphous precipitated silicic acid and the calcium carbonate of Example 10 are used in a 25 percent by weight aqueous suspension and are ground to a mean particle diameter (d50) of 5.0 μm in a bead mill. The suspension is suction filtered, dried mildly to a water content of 5 percent by weight at 70° C. and deaggregated.

The results are summarized in Table II.

COMPARATIVE EXAMPLE 13

The procedure of Example 10 is repeated except for the fact that a water content of 15 percent by weight is adjusted before grinding which is subsequently reduced during grinding to 12 percent by weight. The mean particle diameter (d50) is determined as 5.3 μm.

The results are summarized in Table II.

EXAMPLE 14

The amorphous precipitated silicic acid with the properties as described in Example 10 is ground in a jet mill together with a commercial calcium carbonate (mean particle size: 2.0 μm) in the weight ratio of 70/30 to a mean particle size of 3.8 μm. The water content is approximately 5 percent by weight.

The results are reported in Table II.

COMPARATIVE EXAMPLE 15

The amorphous precipitated silicic acid of Example 10 is ground and subsequently homogenized in the dry state with the calcium carbonate of Example 14 in a Weight ratio of 70/30. The mean particle diameter of the mixture is 3.8 μm.

The results are reported in Table II.

COMPARATIVE EXAMPLE 16

A commercial, amorphous silicic acid for use in thermoreactive papers, produced according to EP-B1-0 114,749, is homogenized in the dry state together with the calcium carbonate of Example 14 in the weight ratio of 70/30. In this process, a mean particle size distribution of 4 μm is obtained.

The results are reported in Table II.

EXAMPLE 17

The procedure of Example 14 is repeated except that the jet mill is run at a higher temperature (about 100° C.), such that the water content of 5 percent by weight is reduced to about 1.5 percent by weight during grinding. The mean particle diameter is 4.0 μm.

The results are reported in Table II.

EXAMPLE 18

A mixture of 60 percent by weight of the amorphous precipitated silicic acid used according to Example 10 and 40 percent by weight of calcium carbonate of the same example is run through a pin mill at a pigment moisture content of 5 percent by weight and ground to a mean particle size of 8.5 μm. The particle size of this product ranged from about 100 to about 1 μm.

The results are reported in Table II.

EXAMPLE 19

The procedure of Example 18 is repeated except that a mean particle diameter of 6.6 μm and a total particle range of about 50 to 1 μm is adjusted by means of slightly increasing the grinding energy.

The results are reported in Table II.

EXAMPLE 20

The procedure of Example 17 is repeated except that grinding is conducted to obtain a mean diameter of 5.2 μm and a total particle range of about 30 to 1 μm.

The results are reported in Table II.

TABLE II

| | | | Properties of Thermoreactive-filling Materials | | | | |
| --- | --- | --- | --- | --- | --- | --- | --- |
| Example | Silicic Acid/CaCO3 | Grinding/ homogenization | Water Content during grinding (%) | Mean Particle Diameter d50 (μm) | Specific Surface m2/g | Oil Absorption ml/100 g | Surface Activity |
| 10 | 60/40 | hammer mill | 4–5 | 5.2 | 36 | 148 | + |
| 11 | 60/40 | hammer mill | 5 | 5.2 | 40 | 150 | 0 |
| 12 | 60/40 | bead mill | 75 | 5.0 | 52 | 148 | 0 |
| 13 | 60/40 | hammer mill | 12–15 | 5.3 | 44 | 140 | 0 |
| 14 | 70/30 | jet mill | 5 | 3.8 | 43 | 140 | + to ○ |
| 15 | 70/30 | homogenizer | 5 | 3.8 | 48 | 138 | ○ to − |
| 16 | 70/30 | homogenizer | 5 | 4.0 | 40 | 153 | ○ to − |
| 17 | 70/30 | jet mill | 5 | 4.0 | 40 | 154 | + |
| 18 | 60/40 | pin mill | 5 | 8.5 | 40 | 122 | + |
| 19 | 60/40 | pin mill | 5 | 6.6 | 42 | 132 | + |
| 20 | 60/40 | pin mill | 5 | 5.2 | 45 | 145 | + |

Table II demonstrates that the examples according to the invention fully meet the requirements for a filling material for thermoreactive papers. By comparing Example 10 with the comparative Examples 11 to 13, it becomes obvious that the simple above described process consisting of grinding silicic acid together with the alkali-earth carbonate at a low water content is superior over a process involving grinding at a high water content, and the pre-treatment in an aqueous suspension as well as grinding the suspension is advantageous with respect to lower surface activity (background dyeing-).Also, comparing Examples 14 and 17 to Examples 15 and 16 demonstrates clearly that the joint grinding according to the invention is to be preferred over separate grinding of silicic acid and alkaline-earth carbonate with subsequent homogenization. Obviously, the reactivity of silicic acid is changed chemically by the alkaline-earth carbonate through joint grinding.

Examples 18 to 20 show that contrary to opinions held previously, the process according to the invention allows for the production of relatively coarse-grained products that are perfectly suitable for use as thermoreactive filling materials. It was found that the coarse-grained products according to Examples 18 and 19 yielded the same results in terms of abrasivity, background activity and dynamization of the thermoreaction as significantly finer products when these coarse-grained products were applied onto a suitable base paper following normal processing of the thermobrushing paint in wet ball mill.

What is claimed is:

1. A particulate composition to be used as filling material in a heat-sensitive layer of a heat-sensitive recording material comprising fine-grained white pigments substantially bound to amorphous precipitated silicic acid wherein the amorphous precipitated silicic acid is wrapped in a layer around the fine-grained white pigment.

2. The particulate composition of claim 1 wherein the particle diameter of the white pigment before being bound to the silicic acid is 100 percent <25 μm and has a mean particle diameter of between about 2 and about 4 μm before being bound to the silicic acid.

3. The particulate composition of claim 1 having an oil absorption of about 100 to about 200 ml/100 g.

4. The particulate composition of claim 3 wherein the oil absorption is about 150 ml/100 g.

5. The particulate composition of claim 1 having a BET-surface of about 30 to about 90 m2/g.

6. The particulate composition of claim 5 wherein the BET-surface is about 60 m2/g.

7. The particulate composition of claim 1 having a particle diameter range of about 100 to about 0.5 μm wherein the mean particle diameter is about 3 to about 8 μm.

8. The particulate composition of claim 1 wherein the mean particle diameter is about 4 to about 6 μm.

9. The particulate composition of claim 1 wherein the white pigment content is about 95 to about 20 percent by weight and the amorphous silicic acid (as dry $SiO_2$) is about 5 to about 80 percent by weight.

10. The particulate composition of claim 9 wherein the white pigment content is about 80 to about 30 percent by weight and the amorphous silicic acid content is about 20 to about 70 percent by weight.

11. The particulate composition of claim 1 wherein the white pigment is an alkaline earth carbonate, an alkaline earth hydroxide, aluminum hydroxide, or mixtures thereof.

12. Heat-sensitive recording material containing in its heat-sensitive layer the particulate composition of claim 1.

13. The particulate composition of claim 12 wherein the water content is about 2 to about 8 percent by weight.

14. A particulate composition to be used as filling material in a heat-sensitive layer of a heat-sensitive recording material comprising fine-grained white pigments most of which are bound to amorphous precipitated silicic acid wherein the amorphous precipitated silicic acid is bound to the fine-grained white pigment in a punctiform manner, and wherein the water content is about 1 to about 10 percent by weight based on the total weight of said composition.

15. The particulate composition of claim 14 wherein the particle diameter of the white pigment before being bound to the silicic acid is 100 percent <25 μm and has a mean particle diameter of between about 2 and about 4 μm before being bound to the silicic acid.

16. The particulate composition of claim 14 having an oil absorption of about 100 to about 200 ml/100 g.

17. The particulate composition of claim 16 wherein the oil absorption is about 150 ml/100 g.

18. The particulate composition of claim 14 having a BET-surface of about 30 to about 90 m2/g.

19. The particulate composition of claim 18 wherein the BET-surface is about 60 m2/g.

20. The particulate composition of claim 14 having a particle diameter range of about 100 to about 0.5 μm wherein the mean particle diameter is about 3 to about 8 μm.

21. The particulate composition of claim 20 wherein the mean particle diameter is about 4 to about 6 μm.

22. The particulate composition of claim 14 wherein the white pigment content is about 95 to about 20 percent by weight and the amorphous silicic acid, as dry $SiO_2$, is about 5 to about 80 percent by weight.

23. The particulate composition of claim 22 wherein the white pigment content is about 80 to about 30 percent by weight and the amorphous silicic acid content is about 20 to about 70 percent by weight.

24. The particle composition of claim 14 wherein the white pigment is an alkaline earth carbonate, an alkaline earth hydroxide, aluminum hydroxide, calcined kaolin, a pigment based on urea-formaldehyde resin or mixtures thereof.

25. Heat-sensitive recording material containing in its heat-sensitive layer the particulate composition of claim 14.

* * * * *